Patented Mar. 17, 1936

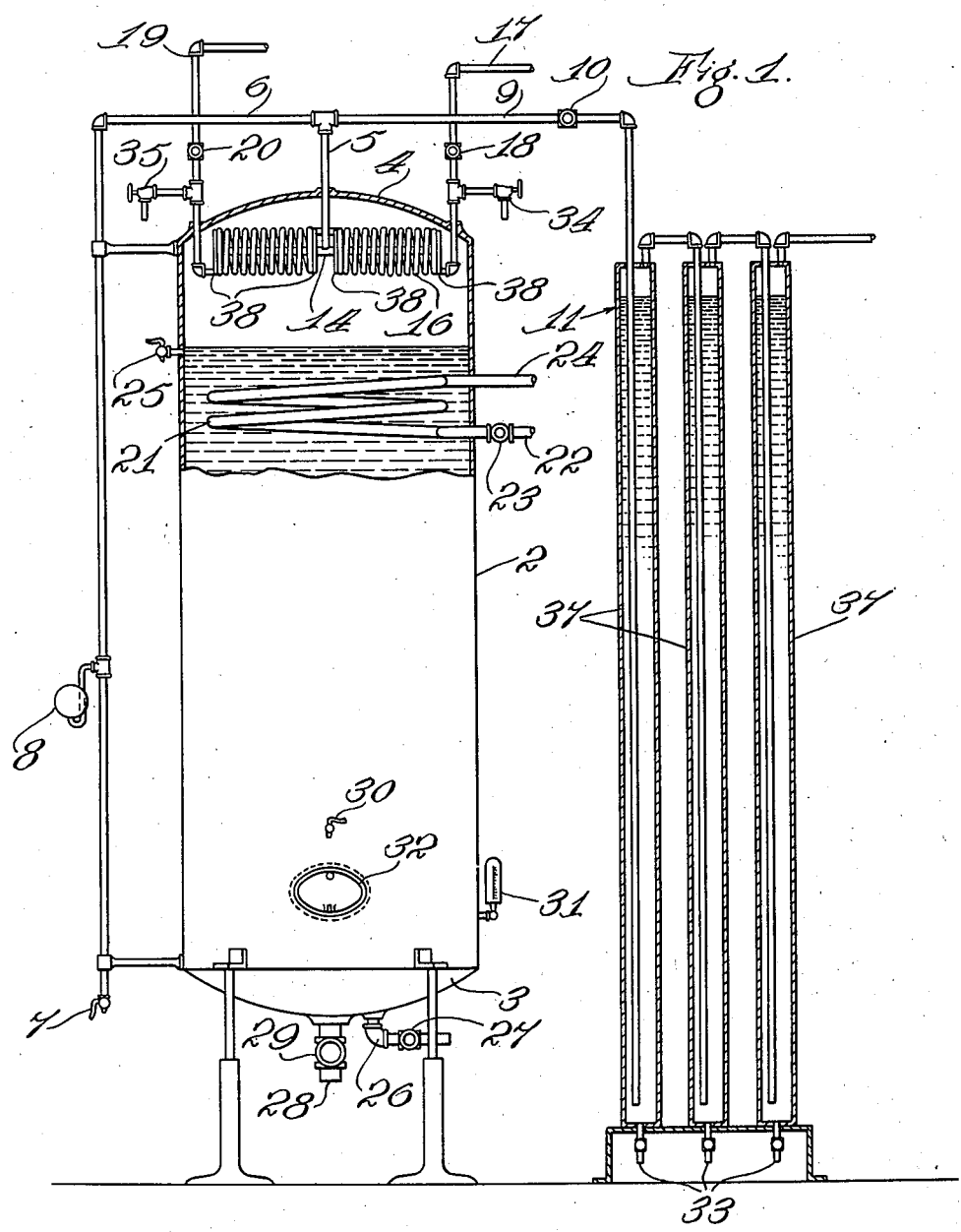

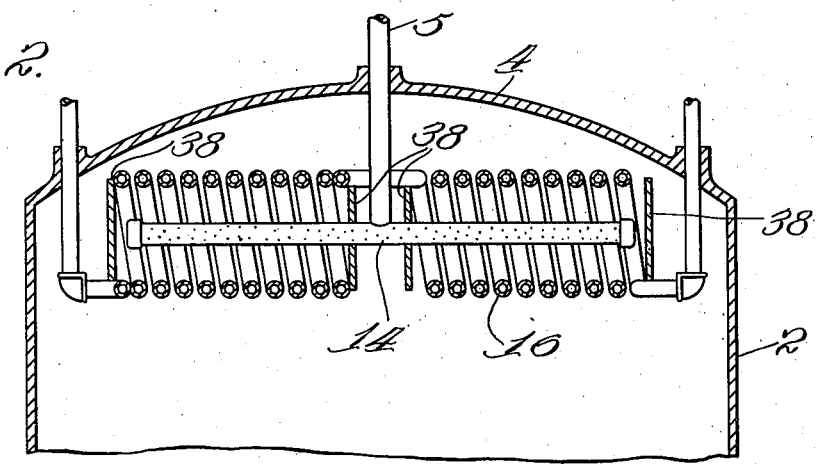
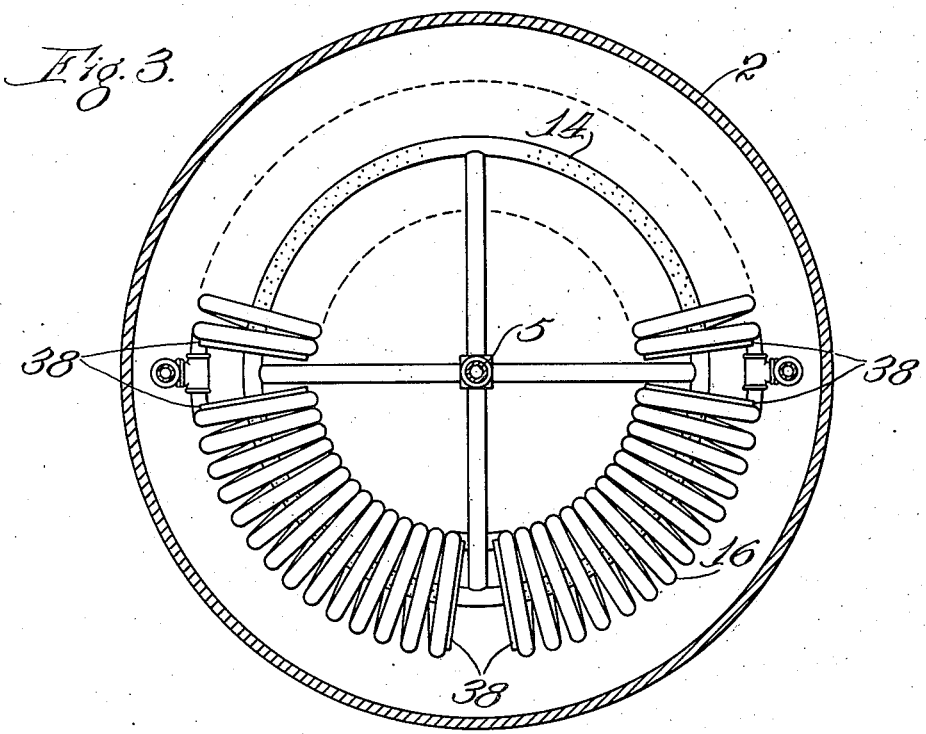

2,034,468

UNITED STATES PATENT OFFICE 2,034,468

MANUFACTURE OF FERMENTED BEVERAGES

Herman Heuser, Evanston, Ill., assignor to United States Process Corporation, Chicago, Ill., a corporation of Illinois Application December 2, 1932, Serial No. 645,467

8 Claims. (Cl. 99—45)

My invention relates to the manufacture of fermented beverages and particularly yeast fermented beverages, such as for example beverages of the type of beer, and particularly to the fermentation of the same, the main object of my invention being to increase in these beverages the amount of the volatile flavor and aroma substances produced during the fermentation of these beverages.

I have observed that during the fermentation of yeast-fermented beverages, that is to say during the main fermentation of the same, most of the volatile flavor and aroma substances produced by fermentation are carried off by the fermentation vapors, which are produced in considerable quantity because of the continual production of carbon dioxide. I find that the amount of volatile flavor and aroma retained in the fermented beverage is inversely proportional to the amount of carbon dioxide carried off with the vapor from the fermented beverage, but directly proportional to the amount of carbon dioxide retained in the fermented beverage.

Therefore, if the amount of carbon dioxide retained in the fermented wort or beer during fermentation is for example double as large as the customary amount of carbon dioxide retained in the fermented beverage, which is 0.15 to 0.20%, then the amount of volatile flavor and aroma retained in the fermented wort is double as large as customarily is the case, but when for example all the carbon dioxide produced during fermentation is retained in the beverage, then the fermented beverage will contain all the volatile flavor and aroma produced during fermentation. Inasmuch as this in general is more than the market quantity of carbon dioxide, however, unless the amount of carbon dioxide retained in the fermented beverage can be removed to the market amount without reducing the amount of the volatile flavor and aroma substances contained in the fermented beverage, there will still be a partial loss of flavor and aroma.

I have discovered that yeast will carry on fermentation in beer wort under a super-atmospheric pressure up to several hundred pounds, built up by the fermenting energy, with which the yeast produces carbon dioxide. Therefore, yeast will readily ferment wort of normal composition under a pressure sufficiently high to retain all the carbon dioxide in the wort that is produced during the fermentation of the wort less the amount, of course, which is contained in the space above the wort, which being in a gaseous state is, however, a relatively small portion of the carbon dioxide produced during the fermentation of the wort.

Further, I have discovered that, by condensing in the space above the fermenting beverage the vapor produced during the fermentation of the beverage, the volatile flavor and aroma substances contained in the vapor are refluxed with the condensed vapor back into the beverage.

The refluxing of the fermentation vapors is the means for reducing the amount of carbon dioxide, retained in the beverage fermented under a high super-atmospheric pressure, to the amount required in the market beverage, which is about 0.40%, more or less, without reducing the amount of flavor and aroma retained in the beverage.

Thus, the refluxing of the fermentation vapors makes it possible to ferment a beverage under any suitable super-atmospheric pressure, and even under the pressure of the atmosphere and retain in the beverage substantially all the volatile flavor and aroma produced during the fermentation of the beverage. Thus, the refluxing of the fermentation vapors makes it possible to ferment a beverage under a super-atmospheric pressure that keeps in the beverage all the carbon dioxide produced during the fermentation or as much carbon dioxide as is required in the market beverage, namely about 0.40%, or as much as is retained in the beverage by fermenting it under atmospheric pressure as customarily is the case, namely 0.15 to 0.20%, and retain in either case in the beverage all the flavor and aroma produced during the fermentation of the beverage.

At the same time I have discovered that production of the beverage while containing 0.40% of carbon dioxide or more materially prevents the growth of foreign ferments, and improves the flavor and aroma in that way.

In the following I will describe an apparatus suitable to carry out my invention.

Fig. 1 shows a fermenting apparatus consisting of fermenting tank 2 with dished bottom 3 and dished top 4, preferably made of welded or seamless steel, glass lined on the inside or covered by a suitable iron varnish on the inside, or made of chromium-nickel steel also termed rustless steel.

Fermenting tank 2 is provided with a gas pipe 5 connected to vent pipe 6 provided with valve 7 and pressure gauge 8 and further with pipe 9 equipped with valve 10 leading to water sealing device 11 consisting of 3 water columns 37 connected in series, which may be increased to any larger plurality. The sealing pressure of the device is raised or lowered by raising or lowering the water level in columns 37 by the introduction or withdrawal of water through spigots 33.

Gas pipe 5 terminates in pipe 14, which is provided with numerous perforations for the outlet of the carbon dioxide produced during the fermentation, and which is surrounded by a longitudinal closely ringed spiral cooler or condenser 16 to reflux the fermentation vapor that arises from the beverage with the carbon dioxide. Reflux condenser 16 is further provided with pipe 17 equipped with valve 18 for the inlet of the cooling medium such as cold brine and with pipe 19 equipped with valve 20 for the outlet of the cooling medium to the source of cold supply, not shown. Reflux condenser 16 is usually also equipped with valved pipe 34 for the inlet of the heating medium such as warm water and with valved pipe 35 for the outlet of the heating medium in order to reflux by melting at the end of the fermentation, or as required, the flavor and aroma containing ice or snow, with which the condenser 5 may be covered, in case the condensation of some of the fermentation vapor was carried to the point of snow or ice.

Instead of having the perforated pipe extension 14 of gas pipe 5 and the spiral condenser 16 in longitudinal form, as shown in Figs. 1 and 2, the same may be in circular form as seen in Fig. 3. The open ends of the reflux condenser are closed by plates 38.

Tank 2 is further provided with a cooler or attemperator 21 equipped with pipe 22 having valve 23 for the inlet of the cooling medium such as cold brine or cold water and with pipe 24 for the return of the cooling medium to the source of cold supply, not shown, and further tank 2 is provided with a spigot 25 for indicating the height, to which tank 2 is to be filled with beverage, and further with pipe 26 equipped with valve 27 for the inlet and outlet of the beverage, and further with pipe 28 equipped with valve 29 for the outlet of yeast and further with trycock 30, thermometer 31 and manhole door 32, which closes from the inside.

In the following, I will describe a process suitable to carry out my invention in the manufacture of a beverage of the type of beer with substantially all the carbon dioxide produced during fermentation being retained in the beverage:

Hopped wort of customary composition cooled to say 10° C. well impregnated with sterile air and pitched with the usual quantity of yeast is run through valve 27 of pipe 26 into tank 2 with valve 7 and spigot 25 open. As soon as the wort drips out of spigot 25, the filling is stopped by closing valve 27, spigot 25 being closed at the same time.

Presently, the wort starts to ferment and the pressure upon the beverage begins to rise as indicated on gauge 8. The rise in pressure continues, until the fermentation is at an end, at which time the pressure upon the beverage lies usually between 100 and 200 lbs., retaining about 1.50 to 3.00% carbon dioxide in the beverage, the exact size of the pressure and carbon dioxide content depending upon the amount of fermentable carbohydrate substances originally contained in the wort. When the pressure as indicated on gauge 8 does not rise any more, the fermentation of the wort has been completed. The fermented beverage is cooled to a low temperature of say 2 to 3° C. by opening valve 23 of attemperator 21.

After the wort has been cooled to 2 to 3° C., valve 18 is opened for the circulation of cold brine say at −5–10° C. in condenser 16. Valve 7 is also opened to such a limited extent that the pressure reduction or $CO_2$ escape from the beverage is very slow. This avoids foaming of the beverage and facilitates the refluxing of the vapor rising up with the $CO_2$ from the beverage. Instead of discharging the excess of $CO_2$ through valve 7, the same may be also discharged very slowly through valve 10 of pipe 9 leading to the water sealing device 11. This has the advantage that the $CO_2$ discharge stops automatically, when a pressure of 6 lbs., at which the sealing apparatus was set in this instance, has been reached. After the pressure upon the beverage has been reduced to 6 lbs., valve 10 is closed. The beverage, having a temperature of 2 to 3° C., contains about 0.43% of $CO_2$, which is a market quantity.

Thereupon, when the yeast has settled out of the cooled fermented beverage, as can be seen by sampling the beverage by trycock 30, the beverage may be forthwith filtered and put in the trade packages. However, if desired, the beverage may be stored, until needed for the market, under such conditions as will retain its content of flavor, aroma and $CO_2$.

In the following I will describe a process suitable to carry out my invention in the manufacture of a beverage of the type of beer with a market quantity of $CO_2$ retained in the beverage during the fermentation of the same.

Tank 2 is filled with well aerated yeasted hopped wort having a temperature of say 10° C. up to spigot 25, and thereupon the wort is left to ferment with valve 10 of pipe 9 open leading to sealing device 11 set at a certain pressure, which is 15 pounds, in this instance, and with valve 18 open for circulating in condenser 16 the cooling medium, cold brine in this instance, kept at a sufficiently low temperature to effect refluxing of the fermentation vapor on condenser 16.

The carbon dioxide produced by the fermentation of the wort raises the vapor pressure of the beverage, and at the same time the temperature of the beverage rises and therefore promotes the production of vapor, which is continually condensed with the flavor and aroma substances contained in it on and near condenser 16, that is to say in the condensing area and refluxed back into the beverage. A temperature low enough to produce a substantially dry carbon dioxide is preferred—say a temperature of around −5° C. or less. At the start of the fermentation the carbon dioxide collects in the beverage and in the space above the beverage, until gauge 8 shows a pressure of 15 pounds, when the carbon dioxide, instead of building up further pressure, passes out of tank 2 through valve 10 into sealing device 11, until the wort has been fermented, when the temperature of the beverage is usually about 15° C.

After the wort has been fermented, valve 10 is closed, and thereupon the beverage is cooled to a temperature of say 2 to 3° C., by opening valve 23 of attemperator 21. The carbon dioxide content of the fermented beverage cooled to 2 to 3° C. is as high as the carbon dioxide content of the fermented beverage, before it was cooled and had a temperature of about 15° C., that is to say about 0.40%, which is a market quantity. After the yeast has settled out of the beverage, as can be seen by samples taken at trycock 30, the beverage is ready for filtering and filling into the trade packages. However, the beverage may be put in storage tanks and stored therein under conditions retaining its flavor aroma and carbon dioxide content, until it is needed for the market.

In case the beverage is fermented under atmospheric pressure, then the carbon dioxide produced during the fermentation is continually discharged through valve 7 of vent pipe 6, while condenser 16 is in operation to reflux the fermentation vapor rising up with the carbon dioxide from the fermenting beverage. As the beverage produced by fermentation under atmospheric pressure contains only 0.15 to 0.20% of carbon dioxide, it has to be carbonated, before it is put upon the market.

The beverage thus produced by either one of the processes described for carrying out my invention is distinguished in that it is unusually rich in the characteristic flavor and aroma peculiar to fermented beverages of the type of beer.

The yeast crop from the beverage thus produced, when fermented under a super-atmospheric pressure is unusually pure, becoming purer with each successive fermentation. This is due to the increase in the preserving power of carbon dioxide obtained from a carbon dioxide content higher than usually retained in the beverage during fermentation.

Furthermore the beverage, when fermented under a sufficiently high super-atmospheric pressure, is distinguished in that it contains a market quantity of carbon dioxide, which makes it ready for the market right after fermentation and which protects it against infection by foreign ferments and the absorption of air or oxygen, in case it is to be stored, before it is to be put upon the market.

Obviously, my invention can be also employed to great advantage in the manufacture of yeast fermented beverages made from fruit juices with the final product free from carbon dioxide such as grape wine or containing carbon dioxide such as cider and champagne.

The foregoing detailed description has been given for clearness of understanding only, and no unnecessary limitations should be understood therefrom, but the appended claims should be construed as broadly as permissible, in view of the prior art.

I claim:

1. In the process of manufacturing a yeast-fermented cereal beverage from a cereal wort, the steps of carrying out primary yeast fermentation of the wort in a closed container to generate carbon dioxide, retaining within the beverage substantially all of the generated carbon dioxide, and gradually releasing the carbon dioxide after substantial completion of the fermentation while cooling the evolved vapors to condense moisture and flavor and aroma-bearing constituents thereof, and returning the same to the wort from which they are produced.

2. The process of manufacturing a yeast fermented beverage from a yeast fermentable liquid, which comprises cooling the yeast fermentable liquid to the proper starting fermentation temperature, aerating the liquid, adding yeast to the cooled liquid, fermenting the liquid by the yeast in a closed fermenter under any suitable pressure, condensing to solid form fermentation vapors containing the volatilized flavor and aroma substances above the fermenting liquid which thereby adhere to the condensing means above the fermenting liquid in the fermenter, and returning the volatilized flavor and aroma substances contained in the solid condensate to the liquid by melting the condensate, after the fermentation of the liquid has been completed.

3. The process of manufacturing a yeast fermented beverage from a yeast fermentable liquid, which comprises fermenting a yeast fermentable liquid by yeast in a closed fermenter, condensing the fermentation vapors containing the volatilized flavor and aroma substances to a solid condensate and returning the volatilized flavor and aroma substances to the fermented liquid by melting the condensate into the fermented liquid.

4. The process as set forth in claim 3, in which the yeast fermentable liquid is hopped wort.

5. The process as set forth in claim 3, in which the yeast fermentable liquid is fruit juice.

6. In the process of manufacturing a yeast fermented beverage from a yeast fermentable liquid, the step which comprises condensing the fermentation vapors containing the volatilized flavor and aroma substances to a solid condensate, and returning the condensate to the fermented liquid without substantial contact with air.

7. The process of manufacturing a yeast fermented beverage from a yeast fermentable liquid in a closed fermenter, characterized by carrying out primary yeast fermentation of the liquid to generate carbon dioxide, substantially cooling within the fermenter carbon dioxide evolved from the beverage to a temperature of approximately $-5°$ C. or lower to condense moisture and flavor and aroma-bearing constituents carried by the carbon dioxide, and returning the same to the wort from which they are produced.

8. The process of manufacturing a yeast fermented beverage from a yeast fermentable liquid which comprises fermenting the liquid by yeast in a closed fermenter, condensing substantially all of the fermentation vapors containing the volatilized flavor and aroma substances above the fermenting liquid and within the container, and returning the condensed materials directly therefrom to the liquid.

HERMAN HEUSER.